3,592,879
ANTISTATIC THERMOPLASTIC MOULDING
COMPOSITIONS
Karl-Heinz Ott, Leverkusen, Harry Röhr, Cologne, Hans Weitzel, Leverkusen, and Karl Dinges, Odenthal, Germany, assignors to Farbenfabriken Bayer Aktiengesellschaft, Leverkusen, Germany
No Drawing. Filed Apr. 2, 1968, Ser. No. 718,255
Claims priority, application Germany, June 22, 1967, F 52,753
Int. Cl. C08f *19/08, 41/04*
U.S. Cl. 260—876
6 Claims

ABSTRACT OF THE DISCLOSURE

Elastic thermoplastic moulding compositions of copolymer mixtures of an elastic copolymer or graft polymer of butadiene and a thermoplastic copolymer based on styrene and acrylonitrile, which has excellent electrostatic properties and which contains as an antistatic agent a mixture of (a) a dialkanolalkylamine and (b) an alkyl or aryl alkyl sulfonate.

Conventional thermoplastic moulding compositions based on copolymers and graft copolymers of polymers of butadiene, styrene and acrylonitrile, also known in the art as ABS-polymers, have the considerable advantage of combining high impact strength with outstanding hardness and tensile strength and good processing properties.

Unfortunately, one disadvantage of these known materials, excluding them from various applications for which they would otherwise be used, is their high surface resistance, the effects of which are extremely unfavourable in regard to the electrostatic behaviour of these products. For example, articles made from moulding compositions such as these tend to disintegrate very rapidly into dust, a phenomenon which is highly undesirable for many applications.

Various processes have already been proposed for avoiding or at least reducing the electrostatic charging of thermoplastic moulding composition, for example cellulose acetate or cellulose propionate. For example, mouldings produced from these materials are exposed to air saturated with moisture. The absorption of a certain amount of water vapour reduces the surface resistance of these mouldings to such an extent that they no longer disintegrate into dust, nor are they so readily soiled. The main disadvantage of this process is that, when the mouldings are left to stand in dry air, they very rapidly lose their initially good antistatic properties.

Another method of reducing electrostatic charging, for example in the case of polyolefins, comprises after-treating the surfaces of mouldings produced from materials such as these with agents that form a conductive film over them, thus preventing electrostatic charging. The disadvantage of this method is that, in practical application, a film of this kind is very soon rubbed off or worn away, in addition to which the antistatic agent used is often very hygroscopic, with the result that the surface of the moulding is damaged. Another disadvantage is that the antistatic agent is often physiologically incompatible.

It has also been proposed to introduce antistatically active substances, for example amines, amides, salts of quaternary ammonium bases, and reaction products of amines with alkylene oxides, aryl alkyl phosphates, fatty acid esters of polyglycols, aryl and alkylethers of polyglycols and even polyglycols themselves, into thermoplastic moulding compounds, for example polystyrene and polyolefins, before processing. Alkyl sulphonates and aryl alkyl sulphonates have also been used as antistatic agents.

In order to obtain an adequate antistatic effect, however, the substances referred to above have to be incorporated in such quantities that the mechanical properties of mouldings produced from these materials no longer meet industrial requirements, i.e. they promote considerable deterioration in hardness, rigidity and thermal stability under load. In addition, additives of this kind often detrimentally affect the processing properties of the moulding compositions, the surface quality of the mouldings produced from them and their thermal stability. For example, the addition of amines, apart from substantially reducing thermal stability under load, and from their physiological incompatibility at the processing temperatures normally used for thermoplasts, promotes yellowish to brown discolouration in the resulting mouldings, depending upon the processing temperature. As a result, it is impossible to provide the mouldings with very light or pastel hues.

Similarly detrimental effects are also observed when alkyl and aryl alkyl sulphonates are used. If they are to be antistatically active, compounds such as these also have to be incorporated in fairly large quantities. One particular disadvantage attending the use of these compounds as antistatic additives is that, owing to their incompatibility, they separate from the polymer substrate at the processing temperatures used, being deposited for example on the surface of the injection moulds. This in turn damages the surface of the mouldings, resulting in an appreciable number of rejects. Another disadvantage of using alkyl and aryl alkyl sulphonates is that, assuming they are added in antistatically-active quantities, considerable difficulties are encountered in drying the antistatically finished moulding compounds because, owing to the high tensile content of the moulding composition, substantial amounts of any moisture present are absorbed. As a result, the polymers have to be dried for unusually long periods before injection moulding in order to reduce their moisture content to such an extent that the surfaces of the mouldings are no longer affected by, for example, bubble formation during processing.

According to the present invention, it has now surprisingly been found that elastic thermoplastically mouldable plastics, based on copolymer mixtures of an elastomeric copolymer or graft polymer of butadiene and a thermoplastic copolymer based on styrene-acrylonitrile, and having excellent electrostatic properties, can be obtained without any of the disadvantages referred to above by adding to polymer mixtures of this kind fairly small quantities of a synergistically active mixture of (a) a dialkanolalkylamine, and
(b) an alkyl or aryl alkyl sulphonate.

None of the remaining technological properties for example hardness, stiffness, thermal stability under load and thermal stability, are affected in any way.

The present invention provides thermoplastic moulding compositions comprising (A) 4 to 99.5% by weight of a graft copolymer of
 (a) 10 to 95% by weight of a mixture of
  (1) 50 to 90% by weight of styrene or an alkyl derivative thereof and
  (2) 50 to 10% by weight of acrylonitrile or an alkyl derivative thereof, on
 (b) 90 to 5% by weight of a polymer containing at least 70% by weight of a conjugated diolefin, as graft base, and
(B) 0 to 95.5% by weight of copolymer of
 (a) 50 to 95% by weight of styrene or an alkyl derivative of styrene and
 (b) 50 to 5% by weight of acrylonitrile or an alkyl derivative thereof, the sum total of acrylonitrile, and the alkyl derivatives thereof in components (A) and (B) not exceeding 50% by weight, which compositions also comprise
(C) 0.5 to 6.0% by weight of a synergistically active mixture of
 (a) from 1 to 10 parts by weight of a dialkanolalkylamine of the general formula

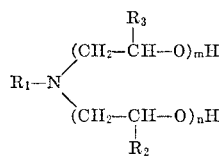

in which $R_1$ represents a linear or branched alkyl radical with 8 to 20 carbon atoms, $R_2$ and $R_3$ each represents a hydrogen atom or a methyl group and $m$ and $n$ each represents an integer from 1 to 20, and
 (b) from 10 to 1 parts by weight of an alkyl or aryl alkyl sulphonate with 6 to 20 carbon atoms in the alkyl chain, which may be linear or branched.

In a preferred embodiment of the invention, the antistatically finished elastic thermoplastic moulding composition has the following composition:
(A) 5 to 60% by weight of a graft copolymer of
 (a) 10 to 95% by weight of a mixture of
  (1) 50 to 95% by weight of styrene or an alkyl derivative thereof and
  (2) 50 to 10% by weight of acrylonitrile or an alkyl derivative thereof,
 (b) 90 to 5% by weight, and preferably 90 to 20% by weight, of a polymer of a conjugated diolefin containing a polymerised diolefin component of at least 80% by weight, as the graft base, and
(B) 34 to 95.5% by weight of a copolymer of
 (a) 50 to 95% by weight of styrene or an alkyl derivative thereof and
 (b) 50 to 5% by weight of acrylonitrile or an alkyl derivative thereof, the sum total of acrylonitrile, styrene and alkyl derivatives thereof in components A and B together not exceeding 50% by weight, and
(C) 0.5 to 6.0% by weight of a synergistically active mixture of
 (a) from 1 to 10 parts by weight of a dialkanolalkylamine of the general structure

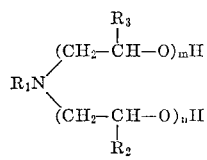

in which $R_1$ represents a linear alkyl radical with 8 to 18 carbon atoms, $R_2$ and $R_3$ each represents a hydrogen atom or a methyl group and $m$ and $n$ each represents an integer from 1 to 5, and
 (b) from 10 to 1 parts by weight of an alkyl- or an aryl alkyl sulphonate with 6 to 20 carbon atoms in the alkyl chain, which may be linear or branched.

The effect discovered by using the synergistically active mixture was all the more surprising insofar as it was known that the two individual components only exert a detectable antistatic effect when employed in large proportions, so that, when combined, they had merely been expected to produce an additive or accumulative effect. If, however, the claimed combination is added in the ratios specified to elastic thermoplastic moulding compounds of the above kind, it is evident that it promotes a level of antistatic behavior which, in terms of measurement, may even be regarded as astatic.

Apart from an antistatic agent of the kind described in German patent application F 40,209 IVc/39b, the antistatic effect of the known antistatic agents is ultimately dependent upon the formation over the surface of the moulding of a film of moisture which improves surface conductivity to such an extent that any electrical charges applied are dissipated over a period of time. This means that the moisture content and antistatic behaviour bear a direct relation to one another. In contrast to this, however, an almost astatic behaviour, as shown by the moulding compositions according to the present invention, cannot be obtained solely by the development of a film of moisture over the surface of the moulding. This is undoubtedly attributable in part to an improved level of intrinsic conductivity, which promotes the dissipation of charges in the layers near the surface through the inside of the material. Although the mechanism has not yet been explained in detail, the dependence of the electrostatic values upon the particular conditioned test atmosphere would seem to support the above assumption.

As is apparent from the statement of invention, the elastic thermoplastic moulding compositions can be produced by two methods:
(1) The resin-forming monomers can be grafted together on to the graft base described under A (styrene and acrylonitrile are mentioned as examples of resin-forming monomers).
(2) It is also possible to mix the resin-forming monomers, in the form of a copolymer, with the graft polymer component A.

In a preferred embodiment of the invention, the graft base (b) of the above-mentioned graft polymer component A is a butadiene homopolymer or a butadiene-styrene copolymer, preferably in a weight ratio of 90:10.

According to a modification of the present invention, the polybutadiene or butadiene-styrene copolymer used as graft base for producing the graft polymer of component A, may even be replaced by copolymers of conjugated diolefins with one another, for example copolymers of butadiene with isoprene or other 1,3-dienes, or even copolymers of conjugated diolefins containing up to 30% of a copolymerisable monovinyl compound, for example styrene and/or acrylonitrile.

Similarly, it is also possible to replace all or part of the monomers to be grafted on (graft components), i.e. styrene and acrylonitrile, with the corresponding alkyl derivatives of these compounds, in particular α-methyl styrene or nuclear-alkylated styrenes and methacrylonitrile. Polymers with a polymerised butadiene content of at least 90% and a gel content (i.e. component insoluble in toluene) of greater than 80%, are particularly suitable graft bases.

In another preferred embodiment of the invention, a copolymer of styrene and acrylonitrile with a K-value according to Fikentscher [Cellulosechemie 1358 (1932)] of at least 55 and preferably from 58 to 70, is used as copolymer component B. Once again, all or part of the styrene and acrylonitrile in this component may be replaced by the alkyl derivatives of these components, in particular α-methyl styrene and/or a nuclear-substituted styrene, and methacrylonitrile. Thermoplastic copolymers of 95 to 65% by weight of styrene and/or α-methyl styrene and 5 to 35% by weight of acrylonitrile are of particular interest in this respect.

According to the invention, the aforementioned moulding compositions contain an antistatic additive which contains the following individual components;

(a) From 1 to 10 parts by weight of a dialkanolalkylamine of the general structure

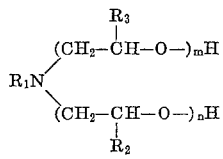

in which $R_1$ represents a linear or branched alkyl radical with 8 to 20 carbon atoms, $R_2$ and $R_3$ each represents a hydrogen atom or a methyl group and $m$ and $n$ each represent integers from 1 to 30.

(b) From 10 to 1 parts by weight of an alkyl- or aryl alkyl sulphonate with from 6 to 20 carbon atoms in the alkyl chain which may either be linear or branched.

In a preferred embodiment of the invention, a dialkanolalkylamine is used whose hydrocarbon radical $R_1$ has a linear alkyl radical with from 8 to 18 carbon atoms, $R_2$ and $R_3$ each represent a hydrogen atom or a methyl group and $m$ and $n$ each represent 1. Examples of compounds such as these include dodecyl diethanolamine, isododecyldiethanolamine, tetradecyl diethanolamine, pentadecyldiethanolamine and isopentadiethanolamine. In another preferred embodiment, component (b) is a linear alkyl sulphonate whose hydrocarbon radical contains from 8 to 18 carbon atoms, an example of which is commercially available under the name Mersolat K30.

The graft copolymer component A can be prepared in known manner by polymerising the monomers to be grafted on in the latex of the polydiolefin used as graft base. In this instance, the procedure adopted is the same in principle as in the preparation of resin component B, as described more fully below.

A 1,3-diolefin, preferably a butadiene homopolymer or copolymer latex prepared in known manner by emulsion polymerisation of the monomers, is used as graft base in the preparation of A. In principle, the emulsifiers, regulators, catalysts and electrolytes which are described below in regard to the preparation of B may also be used within the limits sepecified there.

The thermoplastic copolymer component of styrene and acrylonitrile (i.e. B) is preferably prepared by polymerising the monomers in aqueous emulsion in the usual way. The conventional quantities of water, emulsifiers, regulators, polymerisation catalysts, pH-regulators and other additives may be used for this purpose. For example, the monomers or polymer concentration can be from 20 to 50%, i.e. 400 to 100 parts by weight of water can be used per 100 parts by weight of monomer.

According to a modification of the invention, however, both the graft polymer component A and the copolymer component B may also be prepared by other polymerisation processes, the following being mentioned by way of example for the preparation of copolymer component B: precipitation polymerisation, suspension polymerisation and block polymerisation.

Where polymerisation is carried out in accordance with the preferred embodiment, i.e. in aqueous emulsion, the following emulsifiers for example may be used: alkali metal salts of long-chain fatty acids with from 10 to 20 carbon atoms, alkyl sulphates with from 10 to 20 carbon atoms, alkyl aryl sulphates with from 10 to 20 carbon atoms, and resin acids.

In another preferred embodiment, however, the emulsifiers used are of the kind that already make up part of the antistatically active combination, i.e. alkyl sulphonates and alkyl aryl sulphonates. When this procedure is adopted, only the dialkanoalkylamine component need be added to the moulding compounds in the further course of production which greatly facilitates the process as a whole.

In order to adjust the required molecular weight, long-chain mercaptans, for example n-dodecyl or tert.-dodecyl mercaptan, may be added.

Suitable polymerisation catalysts include inorganic or organic peroxidic compounds, for example patassium or ammonium persulphate, tert.butyl hydroperoxide or cumene hydroperoxide. It is also possible to use redox systems comprising the aforementioned peroxidic compounds and reducing agents, especially compounds of sulphur in a low valency state, such as formaldehyde sulphoxylate, as well as bases such as triethanolamine.

Polymerisation may be carried out at pH-values from 2 to 11. In order to maintain a particular pH-range, so-called pH-regulators, for example salts of orthophosphonic or pyrophosphoric acid may be added.

Polymerisation may be carried out at temperatures in the range from about 20 to 100° C., but is preferably carried out at temperatures from 40 to 90° C.

The antistatically active combination may be added to the copolymer or graft copolymer component used in accordance with the invention by various more or less conventional methods:

(1) Both the dialkanolalkylamine component and the sulphonate component can be incorporated in the dry powder of the polymer mixture by means of suitable mixing units, preferably in the presence of pigments and other additives. Examples of suitable mixers include mixing rolls, Banbury mixers, high-speed mixers and fluid mixers, followed by single-screw or double-screw extruders.

(2) If an alkyl sulphonate or an aryl alkyl sulphonate (or a mixture thereof) is used as emulsifier in the preparation of the moulding compositions, the dialkanolalkylamine component may also be worked into the powder by means of the above-mentioned mixers.

(3) In a preferred embodiment, the following procedure is adopted for the preparation of the antistatic moulding compositions:

(a) The sulphonate component is introduced in such a way as to act as an emulsifier in the preparation of the moulding compositions.
(b) The dialkanolalkylamine component can be mixed in the form of an aqueous emulsion with the mixture of the lattices of components A and B, preferably at room temperature, and the resulting mixture subsequently coagulated as known per se.

The dialkanolalkylamine emulsion may be prepared in the usual way by stirring the dialkanolalkylamine into an aqueous emulsifier solution by means of a high-speed stirrer. The quantities of water used preferably amount to from 0.5 to 2 parts by weight of water to 1 part by weight of dialkanolalkylamine. The tensile described above are used as emulsifiers, preferably in quantities of from 0.5 to 5.0%, by weight, based on dialkanolalkylamine.

The mixtures may be coagulated by methods known per se. There are, in principle, two alternative methods that may be used for this purpose:

(1) Electrolytes, inorganic salts in particular, are added to the latex mixture or to the latex/dialkanolalkylamine mixture, and the resulting product is heated at elevated temperature.

(2) The mixture is coagulated by cooling to temperatures below 0° C.

If the sulphonate component is added at a later stage, acids, for example acetic acid or hydrochloric acid, may be used as coagulants in addition to inorganic salts, depending upon the type of emulsifier used.

The coagulates are worked up by known methods for the preparation of coagulates of elastic thermoplastic copolymer mixtures, i.e. the coagulates are separated, washed free of electrolyte or washed until neutral, and then dried at a temperature below 100° C., preferably in vacuo.

The dried material is then compacted or consolidated, and homogenised by means of suitable machines, for example mixing rolls and single-screw or multi-screw extruders, at temperatures from about 130 to 180° C., after which they may be granulated if desired. The compact and at the same time antistatic compositions thus obtained may be formed in the usual way on conventional processing machines, for example injection-moulding machines.

The fillers, antiagers, pigments and lubricants, for example zinc stearate, calcium stearate or wax, normally used for thermoplastic plastics may be added to the moulding compositions according to the invention.

The moulding compositions containing the antistatic combination according to the invention are distinguished by the fact that, in addition to good mechanical properties, for example outstanding hardness, impact strength and notched impact strength (even at low temperatures), coupled with excellent processing properties, they show a high thermal stability under load and at the same time outstanding antistatic behaviour. In addition, it is possible by using the synergistically active antistatic combination to produce mouldings which are completely unaffected by surface damage in view of their outstanding electrostatic behaviour. The invention is illustrated but not limited by the following examples. Unless otherwise indicated, the parts mentioned in the examples are parts by weight.

Assessment of electrostatic behaviour

The data quoted in the following examples in regard to the electrostatic behaviour of the moulding compositions according to the invention, include the following parameters:

(1) Surface resistance ($R_o$),
(2) Limiting charge,
(3) Half-life time.

These characteristics are determined and defined as follows:

(1) Surface resistance [$\Omega$]: Surface resistance is measured in accordance with the Standards DIN 53,482 and VDE 0303. Both surface resistance and charge are measured under the same conditions in the same atmosphere. The values indicate the resistance between two electrodes 10 cm. long mounted at an interval of 1 cm.

(2) Limiting charge (v.cm.$^{-1}$): The limiting charge is measured by a process of the kind described in the journal Kunststoffe 1/1966, pp. 51–54. The plastics panel to be measured is clamped on to a resilient holder by means of a ring. An arm covered with the friction partner rubs over the panel at a frequency of 1 c./s. The field intensity between the specimen panel, charged by friction, and the measuring head is measured and recorded by means of a field intensity meter. Fabrics near to the positive or negative end of the triboelectric voltage series, for example fabrics of polycaprolactam or polyacrylonitrile, are used as the friction partner. The limiting charge, then, is the value which represents the state of equilibrium between the charge supplied by friction which is dissipated again through the surface of the test specimen.

(3) Half life (secs.): The half life period is the period within which the charge has been reduced to half its original value on completion of the rubbing sequence.

All the measurements are made following adequate conditioning in a conditioned cabinet. In each instance, a specimen of known behaviour is used for comparison. In order to avoid errors in measurement, arising when traces of the friction partner are left behind on the surface of the test specimen, a new specimen is used for each individual measurement.

EXAMPLE 1

Preparation by way of the latices, followed by drying, gives a powder mixture comprising the following individual components:

(a) 30 parts of a graft polymer prepared by grafting 70 parts of styrene and 30 parts of acrylonitrile on to 100 parts of polybutadiene in aqueous emulsion. The sodium salt of a disproportionated abietic acid is used as the emulsifier.

(b) 70 parts of a styrene/acrylonitrile copolymer prepared by copolymerising 70 parts of styrene and 30 parts of acrylonitrile in aqueous emulsion. The copolymer has a K-value of 60 and was also prepared in the presence of the above-mentioned emulsifier.

(c) 0.5 part of di-tert.-butyl-p-cresol.

The powder mixture is homogenised on mixing rolls at a temperature of 160° C. and at the same time a mixture of 1.6 parts of a linear alkyl sulphonate with 15 carbon atoms in the alkyl radical and 2.0 parts of pentadecyl diethanolamine are rolled into it. After the additives have been uniformly distributed in the rolled sheet, the sheet itself is taken off and then granulated. To determine the mechanical data, standard test bars are injection-moulded from the granulate, whilst the electrostatic behaviour is determined with test plates having a wall thickness of 4 mm., again injection-moulded from the granulate. The data measured on these test specimens are set out in Tables 1 and 2 under 1.

COMPARISON EXAMPLE A

The procedure is as described in Example 1, except that neither the alkyl sulphonate nor the pentadecyl diethanolamine is added during rolling. The mechanical and electrostatic data, determined on the standard test bars and round discs, are set out in Tables 1 and 2 under A.

COMPARISON EXAMPLE B

In contrast to Example 1, only 1.6 parts of the alkyl sulphonate are added during rolling of the powder mixture, the alkylalkanolamine component being left out altogether. In other respects, the procedure is as described in Example 1. The resulting mechanical and electrostatic data are set out in Tables 1 and 2 under B.

COMPARISON EXAMPLE C

This comparison example differs from Example 1 in that only the alkanolalkylamine component, and no alkyl sulphonate, is added in the quantity specified to the powder mixture during rolling. The data of this moulding composition are also set out in Tables 1 and 2.

EXAMPLE 2

Preparation by way of the latices followed by drying gives a powder mixture comprising the following individual components:

(a) 30 parts of a graft polymer prepared by grafting 70 parts of styrene and 30 parts of acrylonitrile on to 100 parts of polybutadiene in aqueous emulsion. A linear alkyl sulphonate with an average of 15 carbon atoms in the alkyl chain was used as emulsifiers in a quantity of 2.0 parts in the preparation of the graft polymer.

(b) 70 parts of a styrene/acrylonitrile copolymer prepared by copolymerising 70 parts of styrene and 30 parts of acrylonitrile in the presence of the alkyl sulphonate mentioned in (a). The copolymer again has a K-value of 60.

(c) 0.5 part of di-tert.-butyl-p-cresol.

The powder mixture was precipitated from the latex mixture by means of a 2% by weight magnesium sulphate solution. Where this procedure is applied, followed by washing to remove the electrolyte, 1.6% by weight of alkyl sulphonate are left behind in the powder.

The powder mixture was further processed as described in Example 1 except that only 2.0 parts of pentadecyl diethanolamine are added only the mixing rolls because the alkylsulphonate component is already present in the powder. The mechanical and electrostatic data obtained from standard test bars and round discs are set out in Tables 1 and 2 under 2.

TABLE 1.—MECHANICAL DATA

Comparison of the moulding compositions according to the invention with pure polymer mixtures and mouldings containing only one component of the synergistically active mixture

|  | Example | | Comparison examples | | |
| --- | --- | --- | --- | --- | --- |
|  | 1 | 2 | A | B | C |
| Graft polymer component | 30 | 30 | 30 | 30 | 30 |
| Styrene/acrylonitrile copolymer 70:30, K-value=60 | 70 | 70 | 70 | 70 | 70 |
| Alkyl sulphonate with 15 C-atoms in the alkyl chain | 1.6 | 1.6 |  | 1.6 |  |
| Pentadecyl diethanolamine | 2.0 | 2.0 |  |  | 2.0 |
| Impact strength (notched) acc. to DIN 53453 (kp. cm./cm.$^2$): |  |  |  |  |  |
| 20° | 19.7 | 19.3 | 19.1 | 18.5 | 18.7 |
| 0° | 16.0 | 15.4 | 16.2 | 15.2 | 14.2 |
| −20° | 9.9 | 8.5 | 10.1 | 9.8 | 9.5 |
| Ball indentation hardness draft DIN 53456 (kp./cm.$^2$) | 820 | 825 | 830 | 825 | 835 |
| Thermal stability under load acc. to Martens (° C.) | 59 | 59 | 58 | 58 | 59 |

Comparison of the test data shows that the mechanical properties of the moulding compositions according to the invention are fully equivalent to the mechanical properties of the compositions that do not correspond to the invention, i.e. hardness and thermal stability under load remain unaffected.

TABLE 2.—ANTISTATIC VALUES

|  | Graft polymer component | Copolymer component | Alkyl sulphonate addition | Alkyl dialkanol amine addition | Surface resistance $R_o$ in Ω | Friction partner polycaprolactam | | Friction partner polyacrylonitrile | |
| --- | --- | --- | --- | --- | --- | --- | --- | --- | --- |
|  |  |  |  |  |  | Limiting charge (V.cm.$^{-1}$) | Half life (sec.) | Limiting charge (V.cm.$^{-1}$) | Half life (sec.) |
| Example: |  |  |  |  |  |  |  |  |  |
| 1 | 30 | 70 | 1.6 | 2.0 | 8.10$^9$ | −140 | 90 | +2,000 | 510 |
| 2 | 30 | 70 | 1.6 | 2.0 | 1.10$^{10}$ | +200 | 80 | +650 | 90 |
| Comparison examples: |  |  |  |  |  |  |  |  |  |
| A | 30 | 70 |  |  | >10$^{14}$ | −4,000 | >3,600 | +7,100 | >3,600 |
| B | 30 | 70 | 1.6 |  | 1.10$^{11}$ | −3,800 | ~3,600 | +2,600 | ~3,600 |
| C | 30 | 70 |  | 2.0 | 5.10$^{11}$ | +4,800 | ~3,000 | +5,600 | >3,600 |

EXAMPLE 3

3.0 parts of pentadecyl diethanolamine are added during further processing on mixing rolls to the powder mixture described in detail in Example 2. In other respects, the procedure is as described in Example 1. The electrostatic data measured on round discs are set out in Table 3 below.

COMPARISON EXAMPLE D

The data set out in Table 3 under D are obtained by starting with a powder mixture of the kind described in Example 1 and adding to it on mixing rolls (at the temperature specified) 3.0 parts of pentadecyl diethanolamine followed by further processing.

COMPARISON EXAMPLE E

This comparison example is a repetition of Example 2 except that no alkyldialkanolamine is added to the powder mixture on the mixing rolls. The electrostatic data measured on round discs are set out in Table 3 and E.

EXAMPLE 4

Preparation by way of latices, followed by drying gives a powder mixture of the following composition:

(a) 25 parts of a graft polymer prepared by grafting 70 parts of styrene and 30 parts of acrylonitrile on to 100 parts of a copolymer of 90 parts of butadiene and 10 parts of styrene in aqueous emulsion in the presence of 2.0 parts of the sodium salt of disproportionated abietic acid as emulsifier.

(b) 75 parts of a copolymer of 70 parts of styrene and 30 parts of acrylonitrile prepared by emulsion polymerisation in the presence of 2.0 parts of the alkyl sulphonate repeatedly described above.

(c) 0.5 part of di-tert.-butyl-p-cresol.

Preparation is carried out by initially stabilising the latex mixture by the addition to it of an aqueous emulsion of di-tert.-butyl-p-cersol, and then precipitating the powder by means of a 1.5% by weight CaCl$_2$-solution. After washing and drying, the end product contains 1.5% by weight of alkyl sulphonate.

The moulding composition is further processed as already repeatedly described. 2.5 parts of pentadecyl diethanolamine are added to it on mixing rolls. The round discs show the electrostatic properties set out in Table 3 under 4.

EXAMPLE 5

A powder mixture of the following composition is prepared as described in Example 2:

(a) 35 parts of a graft polymer prepared by grafting 70 parts of styrene and 30 parts of acrylonitrile on to 100 parts of polybutadiene. The graft reaction was carried out in aqueous emusion in the presence of 2.0 parts of an n-dodecylbenzene sulphonate.

(b) 65 parts of a styrene-acrylonitrile copolymer prepared by copolymerising 80 parts of styrene and 20 parts of acrylonitrile in aqueous emulsion, n-dodecylbenzene sulphonate being used again as the emulsifier in a quantity of 2.0 parts.

(c) 0.5 part of di-tert.-butyl-p-cresol.

The powder was precipitated from the latex mixture by means of a 2% by weight CaCl$_2$-solution. After washing, 1.65% by weight of n-dodecylbenzene sulphonate are left in the moulding compound.

The powder mixture is further processed in the same way as described in Example 2. The electrostatic data measured on round discs are set out in Table 3 under 5.

TABLE 3.—ANTISTATIC VALUES

|  | Graft polymer component | Copolymer component | Alkyl sulphonate addition | Alkyl dialkanol amine addition | Surface resistance $R_o$ in Ω | Friction partner polycaprolactam | | Friction partner polyacrylonitrile | |
| --- | --- | --- | --- | --- | --- | --- | --- | --- | --- |
|  |  |  |  |  |  | Limiting charge (V. cm.$^{-1}$) | Half life (sec.) | Limited charge (V.cm.$^{-1}$) | Half life (sec.) |
| Example: |  |  |  |  |  |  |  |  |  |
| 3 | 30 | 70 | 1.6 | 3.0 | 4.10$^9$ | <+10 |  | ~−10 | (1) |
| 4 | 25 | 75 | 1.5 | 2.5 | 3.10$^{10}$ | +350 | 35 | +1,200 | 30 |
| 5 | 35 | 65 | 1.65 | 2.0 | 2.10$^{10}$ | −460 | 140 | +550 | 160 |
| Comparison examples: |  |  |  |  |  |  |  |  |  |
| D | 30 | 70 |  | 3.0 | 2.10$^{12}$ | +3,800 | 300 | +5,700 | >3,600 |
| E | 30 | 70 | 1.60 |  | >10$^{14}$ |  |  | +8,600 | >3,600 |

[1] Immediate discharge, half life immeasurable.

EXAMPLE 6

A latex mixture is prepared from the following individual components, based on solid polymer:

(a) 35 parts of a graft polymer prepared by grafting 84 parts of styrene and 36 parts of acrylonitrile on to 80 parts of a butadiene homopolymer with an average latex particle size of 0.35µ in aqueous emulsion, in the presence of 2.0 parts of a linear alkyl sulphonate with an average of 15 carbon atoms in the alkyl chain.

(b) 65 parts of a styrene/acrylonitrile copolymer prepared by copolymerising 70 parts of styrene and 30 parts of acrylonitrile in aqueous emulsion, the alkyl sulphonate mentioned in (a) being used as the emulsifier in a quantity of 4.0 parts. The copolymer has a K-value of 61.5.

Following the addition of an aqueous stabiliser emulsion of 0.5 part of di-tert.-butyl-p-cresol, based on solid polymer, a 20% by weight aqueous emulsion of pentadecyldiethanolamine is added in such a quantity that the moulding compound contains 2.0 parts of the alkyl diethanolamine, based on solids content. Following precipitation with a 2% by weight magnesium sulphate solution and drying, the powder mixture contains 2.62 parts of alkyl sulphonate and 2.0 parts of pentadecyl diethanolamine. Further processing is carried out as described in Example 1. The electrostatic data measured on round discs are set out in Table 4 under 6.

EXAMPLE 7

The procedure is as described in Example 6, except that the quantity of pentadodecyl diethanolamine is increased to 3.0 parts. The data measured on round discs are set out in Table 4 under 7.

EXAMPLES 8 AND 9

The following components are added to a moulding composition of the kind described in Example 2 on mixing rolls at a temperature of 160° C.:

| Example | 8 | 9 |
|---|---|---|
| Octadecyl dipropanolamine, parts | 3.0 | |
| Dodecyl dipropanolamine, parts | | 3.0 |

After the additives have been homogeneously distributed in the rough sheet, the sheet itself is drawn off and then granulated. Round discs injection-moulded from the granulate show the data set out in Table 4 under 8 and 9.

EXAMPLE 10

The following graft polymer is prepared in aqueous emulsion in the presence of 3.0 parts of a linear alkyl sulphonate with an average of 12 carbon atoms in the alkyl chain:

A monomer mixture comprising 56 parts of styrene and 24 parts of acrylonitrile, is grafted on to 20 parts of polybutadiene (in the form of a 55% by weight latex with an average latex particle size of 0.35µ at a temperature of 65° C. in the presence of potassium persulphate as activator. On completion of polymerisation, 0.5 part of di-tert.-butyl-p-cresol and 2.0 parts of pentadecyl diethanolamine, based on solid polymer each in the form of a 20% by weight aqueous emulsion, are added to the resulting latex.

Following precipitation with magnesium sulphate solution, the moulding compound is washed (until free of electrolyte) and then dried in vacuo at 70° C. Further processing is carried out in the same way as has already been repeatedly described. The electrostatic data as measured on round discs are set out in Table 4 under 10.

EXAMPLE 11

Preparation by way of the latices, followed by drying, gives a powder mixture comprising the following individual components:

(a) 25 parts of a graft polymer prepared by grafting 70 parts of styrene and 30 parts of acrylonitrile on to 100 parts of a butadiene-styrene copolymer in a ratio of 90:10 in aqueous emulsion. The sodium salt of disproportionated abietic acid is used as emulsifier.

(b) 75 parts of an α-methyl styrene/acrylonitrile copolymer prepared by copolymerising 70 parts of α-methyl styrene and 30 parts of acrylonitrile in aqueous emulsion. The copolymer has a K-value of 56, and was polymerised in the presence of 2.5 parts, based on 100 parts of monomer mixture, of a branched alkyl sulphonate with an average of 15 carbon atoms in the alkyl chain.

(c) 0.5 part of 2,2'-methylene-bis-4-methyl-6-cyclohexylphenol.

The moulding composition is further processed in exactly the same way as described in Example 1, except that 3.5 parts of pentadecyldiethanolamine are added on the mixing rolls. The electrostatic data measured on round discs are set out in Table 4 under 11.

TABLE 4.—ANTISTATIC VALUES

| Example | Graft polymer component | Copolymer component | Alkyl sulphonate addition | Alkyl dialkanol amine addition | Surface resistance $R_0$ in Ω | Friction partner polycaprolactam | | Friction partner polyacrylonitrile | |
|---|---|---|---|---|---|---|---|---|---|
| | | | | | | Limiting charge (V.cm.⁻¹) | Half life (sec.) | Limiting charge (V.cm.⁻¹) | Half life (sec.) |
| 6 | 35 | 65 | 2.62 | 2.0 | 2.10¹⁰ | −190 | 60 | +920 | 130 |
| 7 | 35 | 65 | 2.62 | 3.0 | 5.10⁹ | +200 | 5 | | (¹) |
| 8 | 30 | 70 | 1.6 | 3.0 | 2.10¹⁰ | +1,600 | 50 | +2,700 | 55 |
| 9 | 30 | 70 | 1.6 | 3.0 | 1.10¹⁰ | | | +2,800 | 51 |
| 10 | 100 | | 2.25 | 2.0 | 2.10¹⁰ | | | +930 | 85 |
| 11 | 25 | 75 | 2.0 | 3.5 | 1.10¹⁰ | +210 | 16 | +1,000 | 20 |

¹ Half life immeasurable.

We claim:
1. Elastic thermoplastic moulding compositions having antistatic properties and comprising:
(A) 4 to 99.5% by weight of a graft copolymer of
  (a) 10 to 95% by weight of a mixture of
    (1) 50 to 90% by weight of styrene or an alkyl derivative thereof
    (2) 50 to 10% by weight of acrylonitrile or an alkyl derivative thereof, on
  (b) 90 to 5% by weight of a polymer containing at least 70% by weight of a conjugated diolefin, as graft base, and
(B) 0 to 95.5% by weight of a copolymer of
  (a) 50 to 95% by weight of styrene or an alkyl derivative thereof
  (b) 50 to 5% by weight of acrylonitrile or an alkyl derivative thereof, the sum total of acrylonitrile, styrene and alkyl derivatives thereof in the components A and B together not exceeding 50% by weight, and
(C) 0.5 to 6% by weight of a synergistically active mixture comprising
  (a) from 1 to 10 parts by weight of a dialkanol-alkylamine of the general structure

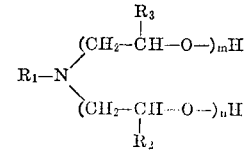

13 in which $R_1$ represents a linear or branched alkyl radical with from 8 to 20 carbon atoms, $R_2$ and $R_3$ each represents a hydrogen atom or a methyl group and $m$ and $n$ each represents an integer from 1 to 20, and
(b) from 10 to 1 parts by weight of an alkyl or aryl alkyl sulphonate with from 6 to 20 carbon atoms in the alkyl chain which may be linear or branched.

2. The elastic thermoplastic moulding compositions of claim 1 wherein said conjugated diolefin is butadiene.

3. The elastic thermoplastic moulding compositions of claim 1 wherein said graft base is a copolymer of butadiene and styrene in a weight ratio of 90:10.

4. Elastic thermoplastic moulding compositions having antistatic properties and based on
(A) 5 to 60% by weight of a graft copolymer of
   (a) 10 to 95% by weight of a mixture of
      (1) 50 to 90% by weight of styrene or an alkyl derivative thereof, and
      (2) 50 to 10% by weight of acrylonitrile or an alkyl derivative thereof, on
   (b) 90 to 5% by weight, and preferably 90 to 20% by weight, of a polymer of a conjugated diolefin containing at least 80% by weight of polymerised diolefin, as the graft base, and
(B) 34 to 95.5% by weight of a copolymer of
   (a) 50 to 95% by weight of styrene or an alkyl derivative thereof and
   (b) 50 to 5% by weight of acrylonitrile or an alkyl derivative thereof the sum total of acrylonitrile, styrene and alkyl derivatives thereof in components A and B together not exceeding 50% by weight, and
(C) 0.5 to 6% by weight of a synergistically active mixture comprising

14

(a) from 1 to 10 parts by weight of a dialkanolalkylamine of the general structure

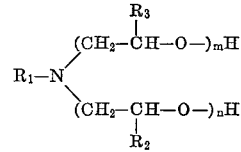

in which $R_1$ represents a linear or branched alkyl radical with from 8 to 20 carbon atoms, $R_2$ and $R_3$ each represents a hydrogen atom or a methyl group and $m$ and $n$ each represents an integer from 1 to 5, and (b) from 10 to 1 parts by weight of an alkyl or aryl alkyl sulphonate with from 6 to 20 carbon atoms in the alkyl chain, which may be linear or branched.

5. The elastic thermoplastic moulding compositions of claim 4 wherein said conjugated diolefin is butadiene.

6. The elastic thermoplastic moulding compositions of claim 4 wherein said graft base is a copolymer of butadiene and styrene in a weight ratio of 90:10.

References Cited

UNITED STATES PATENTS

| 2,992,199 | 7/1961 | Coler et al. | 260—23 |
| 3,376,277 | 4/1968 | Seifert et al. | 260—880X |
| 3,450,794 | 6/1969 | Ebneth et al. | 260—876 |

FOREIGN PATENTS

| 1,089,810 | 11/1967 | Great Britain | 260—Antistatic |

MURRAY TILLMAN, Primary Examiner

H. ROBERTS, Assistant Examiner

U.S. Cl. X.R.

260—29.7, 880